US00RE48113E

(19) United States
(12) Reissued Patent
Stratford

(10) Patent Number: US RE48,113 E
(45) Date of Reissued Patent: *Jul. 21, 2020

(54) SYSTEMS AND METHODS FOR ADJUSTING SYSTEM TESTS BASED ON DETECTED INTERFERENCE

(71) Applicant: CommScope Technologies LLC, Hickory, NC (US)

(72) Inventor: Scott B. Stratford, Campbell, CA (US)

(73) Assignee: CommScope Technologies LLC, Hickory, NC (US)

( * ) Notice: This patent is subject to a terminal disclaimer.

(21) Appl. No.: 16/275,084

(22) Filed: Feb. 13, 2019

Related U.S. Patent Documents

Reissue of:
(64) Patent No.: 8,744,390
Issued: Jun. 3, 2014
Appl. No.: 13/433,407
Filed: Mar. 29, 2012

U.S. Applications:
(63) Continuation of application No. 15/172,840, filed on Jun. 3, 2016, now Pat. No. Re. 47,357, which is an application for the reissue of Pat. No. 8,744,390.

(51) Int. Cl.
*H04B 17/00* (2015.01)
*H04B 17/12* (2015.01)
(Continued)

(52) U.S. Cl.
CPC ..... *H04B 17/12* (2015.01); *H04W 24/08* (2013.01); *H04B 1/40* (2013.01); *H04B 7/022* (2013.01); *H04W 88/085* (2013.01)

(58) Field of Classification Search
CPC ..... H04B 1/1027; H04B 1/26; H04B 17/20; H04B 17/29; H04B 17/309; G01R 29/10; G01R 29/105; H01Q 3/267
(Continued)

(56) References Cited

U.S. PATENT DOCUMENTS 3,755,741 A * 8/1973 Stover ..... 455/226.1
4,580,092 A * 4/1986 Squire ..... 324/646
(Continued)

OTHER PUBLICATIONS

U.S. Patent and Trademark Office, File History from U.S. Appl. No. 13/433,407, 83 Pages, Published: US.
(Continued)

*Primary Examiner* — Minh Dieu Nguyen
(74) *Attorney, Agent, or Firm* — Fogg & Powers LLC

(57) ABSTRACT

Embodiments of the present invention provide improved systems and methods for adjusting system tests based on detected interference. In one embodiment, a system comprises a host unit; a system test controller to control the performance of system tests, wherein a system test to detect the reception of an interfering signal comprises disabling the generation of tones for transmission through the communication system. The system also comprises multiple remote antenna units communicatively coupled to the system test controller to transmit signals to multiple wireless terminals, wherein a remote antenna unit comprises: an antenna; a transceiver, coupled to the antenna; a signal detector that measures reverse and forward power of signals transmitted to and received from the antenna; and a microcontroller to control the antenna unit, wherein upon receiving a command to perform interference testing, the microcontroller adjusts a subsequent test based on measurements of the reverse power by the signal detector.

56 Claims, 5 Drawing Sheets

(51) Int. Cl.

| | |
|---|---|
| ***H04W 24/08*** | (2009.01) |
| *H04B 1/40* | (2015.01) |
| *H04B 7/022* | (2017.01) |
| *H04W 88/08* | (2009.01) |

(58) Field of Classification Search
USPC ..... 455/226.1; 343/703
See application file for complete search history.

(56) References Cited

U.S. PATENT DOCUMENTS

| | | | | |
|---|---|---|---|---|
| 4,829,554 | A * | 5/1989 | Barnes et al. | 455/432.1 |
| 5,140,703 | A * | 8/1992 | Payne | 455/226.1 |
| 5,144,642 | A * | 9/1992 | Weinberg et al. | 375/228 |
| 5,315,257 | A * | 5/1994 | Guillard et al. | 324/627 |
| 5,425,076 | A * | 6/1995 | Knippelmier | 379/27.04 |
| 5,507,010 | A * | 4/1996 | Ahonen | 455/67.14 |
| 5,521,904 | A * | 5/1996 | Eriksson et al. | 370/249 |
| 5,563,603 | A * | 10/1996 | Aker et al. | 342/115 |
| 5,668,562 | A * | 9/1997 | Cutrer et al. | 343/703 |
| 5,815,805 | A | 9/1998 | Crnkovic et al. | |
| 5,831,570 | A * | 11/1998 | Ammar et al. | 342/26 B |
| 5,877,630 | A * | 3/1999 | Kraz | 324/511 |
| 5,963,850 | A * | 10/1999 | Foster | 455/67.15 |
| 5,987,060 | A * | 11/1999 | Grenon et al. | 375/213 |
| 6,154,638 | A * | 11/2000 | Cheng et al. | 455/67.11 |
| 6,311,048 | B1 * | 10/2001 | Loke | 455/245.1 |
| 6,442,398 | B1 * | 8/2002 | Padovani et al. | 455/522 |
| 6,445,773 | B1 * | 9/2002 | Liang et al. | 379/1.04 |
| 6,643,607 | B1 * | 11/2003 | Chamberlain et al. | 702/170 |
| 6,671,308 | B2 * | 12/2003 | Lomp | 375/130 |
| 6,816,575 | B2 * | 11/2004 | Lowell et al. | 379/1.04 |
| 6,834,078 | B1 * | 12/2004 | Niemela et al. | 375/224 |
| 6,873,612 | B1 * | 3/2005 | Steer et al. | 370/342 |
| 6,941,140 | B2 * | 9/2005 | Tateson | 455/434 |
| 6,993,069 | B1 * | 1/2006 | Donati et al. | 375/224 |
| 7,236,778 | B2 * | 6/2007 | Schreiber | 455/423 |
| 7,280,809 | B2 * | 10/2007 | Lauterbach et al. | 455/115.1 |
| 7,286,802 | B2 * | 10/2007 | Beyme et al. | 455/67.14 |
| 7,373,124 | B2 * | 5/2008 | Okanobu | 455/226.1 |
| 7,539,273 | B2 * | 5/2009 | Struckman | 375/341 |
| 7,539,475 | B2 * | 5/2009 | Laroia et al. | 455/296 |
| 7,541,818 | B2 * | 6/2009 | Kosaka et al. | 324/754.29 |
| 7,912,463 | B2 * | 3/2011 | Jin et al. | 455/425 |
| 7,937,731 | B2 * | 5/2011 | Allen | 725/65 |
| 7,983,635 | B2 * | 7/2011 | LaBerge | 455/114.2 |
| 8,000,649 | B2 * | 8/2011 | Shiff et al. | 455/11.1 |
| 8,014,306 | B2 * | 9/2011 | Fiut et al. | 370/252 |
| 8,036,652 | B2 * | 10/2011 | Kawamoto et al. | 455/423 |
| 8,098,748 | B1 * | 1/2012 | Mansour et al. | 375/260 |
| 8,249,512 | B2 * | 8/2012 | Prather | 455/63.1 |
| 8,275,071 | B2 * | 9/2012 | Shen et al. | 375/316 |
| 8,295,258 | B2 * | 10/2012 | Wax et al. | 370/338 |
| 8,325,237 | B2 * | 12/2012 | Bessone et al. | 348/180 |
| 8,463,195 | B2 * | 6/2013 | Shellhammer | 455/67.13 |
| 8,467,735 | B2 * | 6/2013 | Giles et al. | 455/67.11 |
| 8,599,709 | B2 * | 12/2013 | Chen et al. | 370/252 |
| 8,614,644 | B2 * | 12/2013 | Dybdal et al. | 342/383 |
| 8,744,390 | B2 | 6/2014 | Stratford | |
| 2002/0160740 | A1 | 10/2002 | Hatcher et al. | |
| 2002/0173323 | A1 * | 11/2002 | Tateson | 455/509 |
| 2003/0022645 | A1 * | 1/2003 | Runzo | 455/226.2 |
| 2003/0073435 | A1 * | 4/2003 | Thompson et al. | 455/428 |
| 2003/0114111 | A1 * | 6/2003 | Shepherd et al. | 455/67.1 |
| 2005/0164663 | A1 * | 7/2005 | Santhoff et al. | 455/226.1 |
| 2006/0079191 | A1 * | 4/2006 | Parssinen et al. | 455/266.1 |
| 2006/0194552 | A1 * | 8/2006 | Jin et al. | 455/226.1 |
| 2007/0024293 | A1 * | 2/2007 | Kosaka et al. | 324/750 |
| 2007/0121553 | A1 * | 5/2007 | Yoon et al. | 370/335 |
| 2007/0135042 | A1 * | 6/2007 | Shiff et al. | 455/13.3 |
| 2007/0223614 | A1 * | 9/2007 | Kuchibhotla et al. | 375/267 |
| 2008/0205500 | A1 * | 8/2008 | C-Liu et al. | 375/224 |
| 2008/0285684 | A1 * | 11/2008 | Shen et al. | 375/324 |
| 2009/0016456 | A1 | 1/2009 | Li et al. | |
| 2009/0060105 | A1 * | 3/2009 | Tanrikulu et al. | 375/346 |
| 2009/0075612 | A1 * | 3/2009 | Keehr et al. | 455/226.1 |
| 2009/0096662 | A1 * | 4/2009 | Wang et al. | 342/93 |
| 2009/0243394 | A1 * | 10/2009 | Levine | 307/104 |
| 2009/0316608 | A1 * | 12/2009 | Singh et al. | 370/280 |
| 2009/0316611 | A1 * | 12/2009 | Stratford et al. | 370/294 |
| 2009/0318089 | A1 * | 12/2009 | Stratford et al. | 455/67.11 |
| 2010/0041341 | A1 * | 2/2010 | Stratford | 455/67.14 |
| 2010/0240317 | A1 * | 9/2010 | Giles et al. | 455/67.13 |
| 2010/0303182 | A1 * | 12/2010 | Daneshrad et al. | 375/346 |
| 2011/0026645 | A1 * | 2/2011 | Luo et al. | 375/340 |
| 2011/0084887 | A1 * | 4/2011 | Mow et al. | 343/703 |
| 2011/0085612 | A1 * | 4/2011 | Muraoka et al. | 375/260 |
| 2011/0164524 | A1 * | 7/2011 | Kawamoto et al. | 370/252 |
| 2011/0237182 | A1 * | 9/2011 | Stratford et al. | 455/7 |
| 2011/0260920 | A1 * | 10/2011 | Dybdal et al. | 342/379 |
| 2012/0172041 | A1 * | 7/2012 | Krishnamurthy et al. | 455/436 |
| 2012/0207032 | A1 * | 8/2012 | Chen et al. | 370/252 |
| 2013/0094369 | A1 * | 4/2013 | Nielsen et al. | 370/242 |
| 2013/0107763 | A1 * | 5/2013 | Uyehara et al. | 370/278 |
| 2013/0223252 | A1 * | 8/2013 | Perets | 370/252 |
| 2013/0234749 | A1 * | 9/2013 | Honda et al. | 324/762.03 |
| 2013/0245976 | A1 * | 9/2013 | Hind | 702/65 |
| 2013/0260705 | A1 * | 10/2013 | Stratford | 455/226.1 |
| 2014/0051378 | A1 * | 2/2014 | Daneshrad et al. | 455/307 |

OTHER PUBLICATIONS

U.S. Patent and Trademark Office, File History from U.S. Appl. No. 15/172,840, 1480 Pages, Published: US.

* cited by examiner

300

| REFLECTED CAL TONE LEVEL (dB BELOW ALARM THRESHOLD $P_{Rev}$) | INTERFERING SIGNAL LEVEL (dB BELOW ALARM THRESHOLD $P_{Rev}$) | | | | | | | | | | | | | | | |
|---|---|---|---|---|---|---|---|---|---|---|---|---|---|---|---|---|
| | 0 | -1 | -2 | -3 | -4 | -5 | -6 | -7 | -8 | -9 | -10 | | | | | |
| 0 | 3.0 | 2.5 | 2.1 | 1.8 | 1.5 | 1.2 | 1.0 | 0.8 | 0.6 | 0.5 | 0.4 | | | | | |
| -1 | 2.5 | 2.0 | 1.5 | 1.1 | 0.8 | 0.5 | 0.2 | 0.0 | -0.2 | -0.4 | -0.5 | | | | | |
| -2 | 2.1 | 1.5 | 1.0 | 0.5 | 0.1 | -0.2 | -0.5 | -0.8 | -1.0 | -1.2 | -1.4 | | | | | |
| -3 | 1.8 | 1.1 | 0.5 | 0.0 | -0.5 | -0.9 | -1.2 | -1.5 | -1.8 | -2.0 | -2.2 | | | | | |
| -4 | 1.5 | 0.8 | 0.1 | -0.5 | -1.0 | -1.5 | -1.9 | -2.2 | -2.5 | -2.8 | -3.0 | | | | | |
| -5 | 1.2 | 0.5 | 0.0 | -0.9 | -1.5 | -2.0 | -2.5 | -2.9 | -3.2 | -3.5 | -3.8 | | | | | |
| -6 | 1.0 | 0.2 | -0.2 | -1.2 | -1.9 | -2.5 | -3.0 | -3.5 | -3.9 | -4.2 | -4.5 | | | | | |
| -7 | 0.8 | 0.0 | -0.5 | -1.5 | -2.2 | -2.9 | -3.5 | -4.0 | -4.5 | -4.9 | -5.2 | | | | | |
| -8 | 0.6 | -0.2 | -0.8 | -1.8 | -2.5 | -3.2 | -3.9 | -4.5 | -5.0 | -5.5 | -5.9 | | | | | |
| -9 | 0.5 | -0.4 | -1.0 | -2.0 | -2.8 | -3.5 | -4.2 | -4.9 | -5.5 | -6.0 | -6.5 | | | | | |
| -10 | 0.4 | -0.5 | -1.4 | -2.2 | -3.0 | -3.8 | -4.5 | -5.2 | -5.9 | -6.5 | -7.0 | | | | | |

302 304 306 308 310

FIG. 3

SYSTEMS AND METHODS FOR ADJUSTING SYSTEM TESTS BASED ON DETECTED INTERFERENCE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*Notice: More than one reissue application has been filed for the reissue of U.S. Pat. No. 8,744,390. The reissue applications are reissue application Ser. No. 15/172,840 filed Jun. 3, 2016 and this continuation reissue application Ser. No. (the present continuation reissue application). Both reissue applications are reissues of the same issued U.S. Pat. No. 8,744,390 (application Ser. No. 13/433,407 filed Mar. 29, 2012). The present reissue application is a continuation of Reissue application Ser. No. 15/172,840 filed Jun. 3, 2016, which is a reissue of U.S. Pat. No. 8,744,390.*

BACKGROUND

When a distributed antenna system (DAS) performs a system test or calibration procedure, interfering in-band signals of sufficient strength can negatively impact the test and calibration performance. For example, in some tests, a tone is generated for transmission over a remote antenna unit (RAU) antenna. When a detector detects a strong reverse power, the system interprets the reverse power as a tone that was reflected by an incorrectly terminated transmission line, which indicates that the RAU antenna is electrically disconnected. However, when the antenna is connected, a received interfering signal in combination with the generated tone can cause high reverse power that can lead the system test to misinterpret the reverse power as a disconnected antenna. The misinterpreted reverse power can lead the system to falsely raise an alarm indicating that the RAU antenna is disconnected.

For the reasons stated above and for other reasons stated below which will become apparent to those skilled in the art upon reading and understanding the specification, there is a need in the art for improved systems and methods for interference monitoring.

SUMMARY

The embodiments of the present invention provide systems and methods for external frit mounted components and will be understood by reading and studying the following specification.

Embodiments of the present invention provide improved systems and methods for adjusting system tests based on detected interference. In one embodiment, a system comprises a host unit; at least one system test controller configured to control the performance of system tests on the communication system, wherein the at least one system test controller performs a test to detect the reception of an interfering signal comprising disabling the generation of tones for transmission through the communication system. The system also comprises a plurality of remote antenna units communicatively coupled to the at least one system test controller configured to communicatively transmit signals to a plurality of wireless terminals, wherein a remote antenna unit in the plurality of remote antenna units comprises: at least one antenna; a transceiver, coupled to the at least one antenna; at least one signal detector that measures reverse power and forward power of signals transmitted to and received from the at least one antenna; and a microcontroller configured to control the operation of the antenna unit, wherein upon receiving a command from a system test controller to perform interference testing, the microcontroller adjust at least one subsequent test based on measurements of the reverse power by the at least one signal detector.

DRAWINGS

Embodiments of the present invention can be more easily understood and further advantages and uses thereof more readily apparent, when considered in view of the description of the preferred embodiments and the following figures in which:

FIG. 3 is a table illustrating the combination of a calibration tone level and an interfering signal in relation to an antenna disconnect alarm threshold according to one embodiment.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments described in the present application prevent interfering signals from causing false alarms during a system test. For example, when performing a system test of a remote antenna unit (RAU) in a distributed antenna system (DAS), the system generates an in-band tone that is passed through the system. The level of the generated tone is detected at various points throughout the system to check for failures in the operation of the DAS. In one implementation, the system test begins by attempting to detect the presence of strong interfering signals before other tests are performed, where the interfering signal is either in or out of the communications bands communicated by the RAU. To detect the interfering signal, a test controller in the DAS disables any generated tones and downlink RF signals transmitted to the RAU. When the transmissions are disabled, a detector monitors the reverse power received by the RAU and the forward power being transmitted to the DAS. The DAS then compares the detected reverse power against the detected forward power and against an interference threshold. If the reverse power is sufficiently large in comparison to the forward power and/or exceeds the interference threshold when there is no tone being transmitted through the RAU, the system test adjusts other tests in the system tests to prevent false alarms from arising due to the interfering signal.

Figure 1:
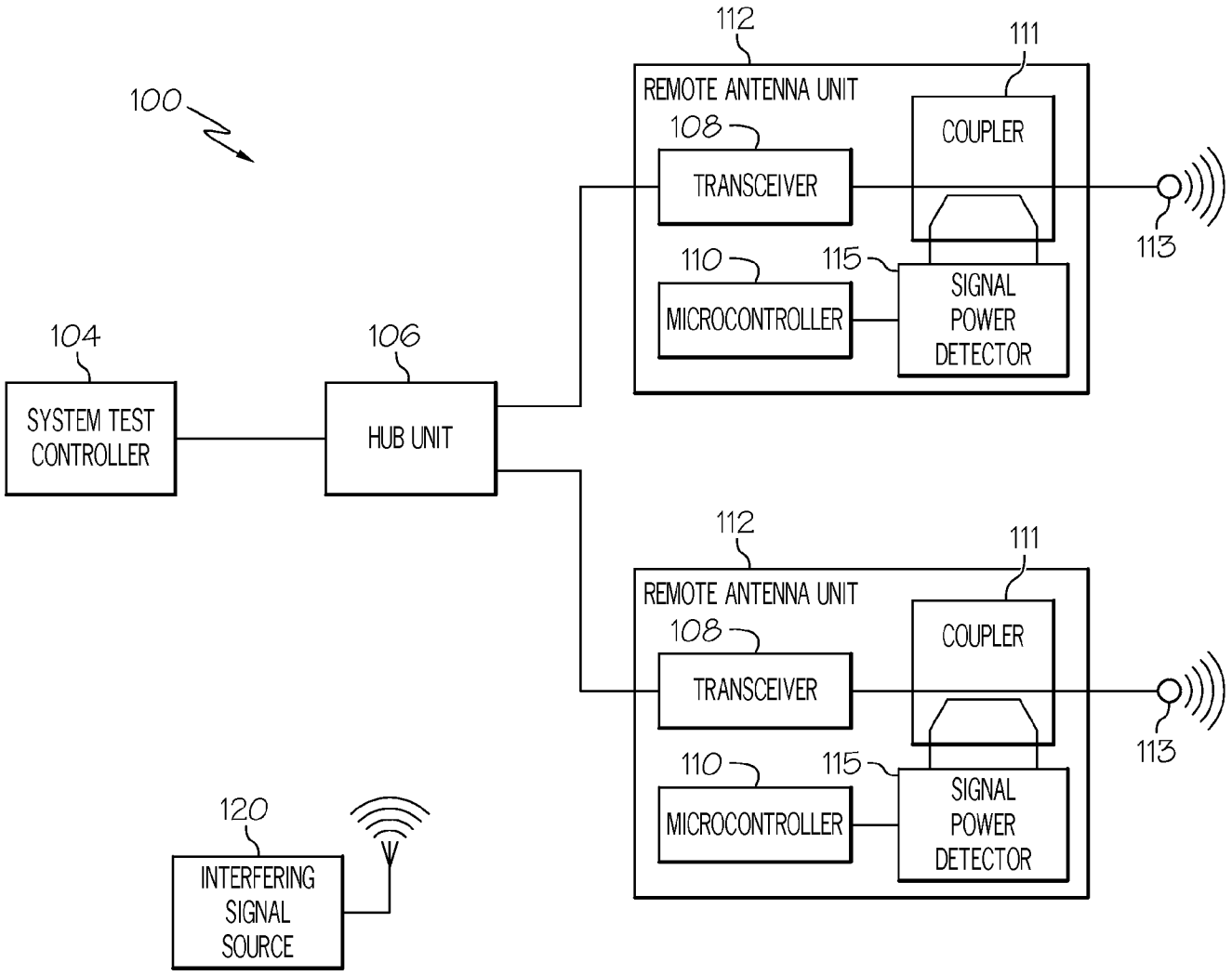
FIG. 1 is a block diagram of one embodiment of a communication system for detecting an interfering signal.

FIG. 1 illustrates one exemplary embodiment of a communication system 100 that performs a system test to detect interfering signals. During normal operation, communication system 100 can function as part of a DAS for transporting radio frequency signals between one or more upstream devices (for example, a base station transceiver, wireless access points, or other sources of radio frequency signals) and one or more downstream wireless devices (for example, a mobile phone, a laptop, and the like). In one embodiment, communication system 100 includes a hub unit 106 and multiple remote antenna units 112, which are attached to antennas 113. In one implementation, when transmitting a radio frequency signal to a downstream wireless device, hub unit 106 receives the signals from an upstream device that is intended for the downstream wireless device and transmits the signal to an RAU 112 where the signal is radiated through antenna 113 for reception by the wireless device.

In certain embodiments, RAU 112 includes a transceiver 108. Transmitter receiver 108 provides a communication interface between hub unit 106 and RAU 112. For example, transceiver 108 receives signals from hub unit 106 to be transmitted over antenna 113. Likewise, transceiver 108 receives signals through antenna 113 for transmission to hub unit 106. In a further implementation, when a signal is transmitted from transceiver 108 to antenna 113, the signal passes through a coupler 111. Coupler 111 couples the signal to a signal power detector 115. Signal power detector 115 measures the power of the signals that are transmitted to and from antenna 113 as both forward and reverse power. When the signal power detector 115 measures the signal power, it transmits the power measurements to a microcontroller 110.

In at least one embodiment, communication system 100 includes a system test controller 104. System test controller 104 controls system tests that check the integrity of uplink and downlink paths throughout communication system 100. System test controller 104 performs system tests when commanded by a user, upon power up, and according to a schedule. In certain exemplary implementations, system tests that are performed by system test controller 104 include coordinating test tone generation with the disabling of generated tones and downlink transmissions such that RAU 112 can monitor for interfering signals, calibrate the gain, check for disconnected antennas, and the like.

In certain implementations, an interfering signal source 120 can produce an interfering signal that can affect the operation of the system tests performed by system test controller 104. For example, interfering signal source 120 can be a separate distributed antenna system that is in close proximity to communication system 100. In at least one implementation, the interfering signal source 120 produces a signal that interferes with a test to detect whether an antenna 113 is connected to an RAU 112. To detect a disconnected antenna, system test controller 104 directs RAUs 112 to begin an antenna disconnect test. In the antenna disconnect test, signal power detectors 115 in RAUs 112 monitor both the reverse power and the forward power of generated reference tones transmitted through RAUs 112 and compare the reverse power against an antenna disconnect alarm threshold. When the signal power detectors 115 measure a reverse power that exceeds the antenna disconnect alarm threshold, microcontrollers 110 in RAUs 112 determine that the reverse power indicates that the forward signal is being reflected by an unmatched termination. In some embodiments, an unmatched termination occurs when antennas 113 are not connected correctly to RAUs 112. However, when the antennas are correctly connected to RAUs 112, the antennas 113 can respond to an interfering signal, which is transmitted toward RAUs 112 and appears as reverse power to the signal power detectors in RAUs 112. If the interfering signal received by RAUs 112 is sufficiently strong such that when it combines with small reflected transmissions already being transmitted through RAUs 112 the interfering signal in combination with the reflected transmission can produce a reverse power that exceeds the antenna disconnect alarm threshold. When the reverse power exceeds the antenna disconnect alarm threshold, the signal power detectors 115 and RAUs 112 interpret the strong reverse power caused from the interfering signal as indicating that antennas 113 are disconnected and consequently, raise a false alarm indicating to a user that the antennas 113 are disconnected.

In at least one exemplary embodiment, a strong interfering signal further impacts other system tests. For example, system test controller 104 directs RAUs 112 to calibrate the gain for forward signals transmitted through RAUs 112. During the gain calibration, the system test controller 104 directs RAUs 112 to adjust gain based on the detected level of a calibrated reference tone that is transmitted to RAUs 112. A strong interfering signal received through the antenna ports of RAUs 112 can affect the measurement of the reference tone by signal power detectors 115 in RAUs 112, which in turn affects the gain calibration.

To prevent a strong interfering signal produced by interfering signal source 120 from causing false alarms and errors during the conducting of other tests, system test controller 104 performs an initial test to detect whether a strong interfering signal is being received by communication system 100. To perform the check for an interfering signal, system test controller 104 disables downlink and calibration tones that are transmitted to RAUs 112 at the beginning of the system tests. When the tones are disabled, the signal power detectors in each individual RAU 112 will measure the reverse power and forward power and then compare the measurements to determine the level of interference received by each RAU 112. When the reverse power and forward power is measured by the signal power detectors 115 in the RAUs 112 or each individual RAU 112, the measurement is used by the RAUs 112 to determine whether or not particular subsequent system tests should be performed. In one exemplary embodiment, when the interfering signal is sufficiently strong, the RAUs 112 will not perform either a test to check if the antenna is disconnected or a test to calibrate the gain when instructed by system test controller 104.

In certain embodiments, to determine that the interfering signal is sufficiently strong such that the antenna disconnect test should not be performed, the signal power detectors 115 in RAUs 112 measure both the reverse power and the forward power through RAUs 112. When the reverse power is sufficiently large when compared to the forward power and a threshold, the system test controller 104 will disable the antenna disconnect test and alarm. Further, if the interference is within some threshold of a gain calibration target, then the gain of RAUs 112 will not adjust their gain correctly and a new alarm is set that indicates that an interfering signal is impeding the performance of the gain calibration. In at least one embodiment, a user can disable the alarms through the use of a human machine interface. Further, the human machine interface indicates to a user that an external signal is preventing system tests.

Figure 2:
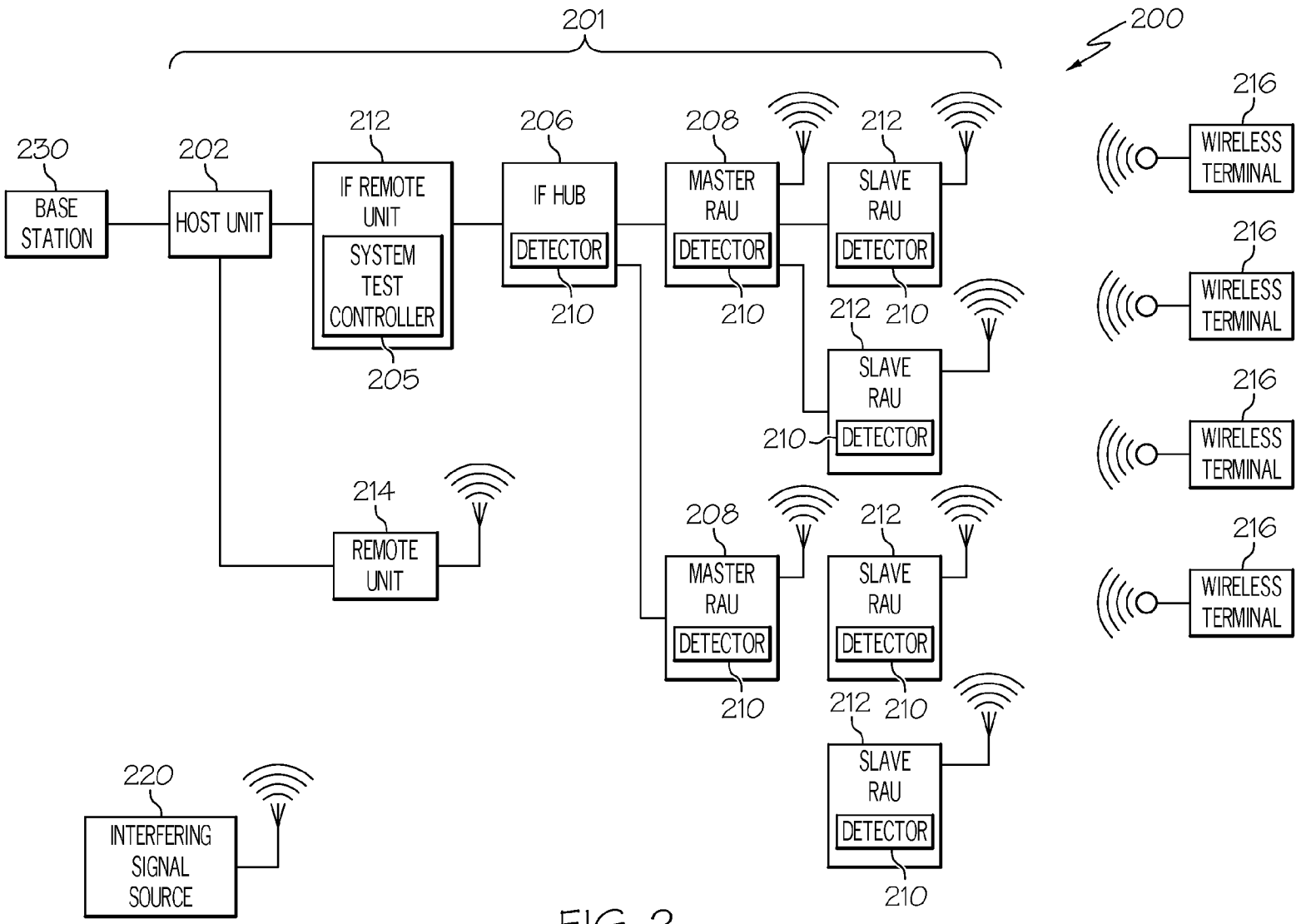
FIG. 2 is a block diagram of one embodiment of a distributed antenna system that is able to detect an interfering signal.

FIG. 2 is a block diagram illustrating a communication network 200. In the embodiment shown in FIG. 2, communication network 200 includes a base station 230, which is communicatively coupled to DAS 201. In certain embodiments, DAS 201 is used to transport radio frequency signals between one or more upstream devices (for example, base station 230, wireless access points, or other sources of radio frequency signals) and one or more downstream wireless devices (for example, wireless terminals 216).

Base station 230 manages communication among wireless terminals 216, and between wireless terminals 216 and other communication networks that are coupled to base station 230. In one embodiment, base station 230 manages communication between wireless terminals 216 and a public switched telephone network (PSTN). In this embodiment, for example, communication network 200 is a cellular/PCS system and base stations 230 communicates with a base station controller which acts as a voice/PSTN gateway to the PSTN. In another embodiment, base station 230 manages communication between wireless terminals 216 and an internet protocol (IP)-based network (such as the internet via communication with an IP gateway). In at least this implementation, base station 230 performs baseband processing on IP data from an IP gateway and places the IP data onto a channel. In one embodiment, base station 230 is an IEEE 802.16 compliant base station. Optionally, base station 230 may also meet the requirements of WiMax, WiBro, LTE, or other consortium. In yet other embodiments, base station 230 comprises multiple functionalities including managing communications between both a PSTN and an IP-based network.

DAS 201 comprises a host unit 202 communicatively coupled to base station 230. Host unit 202 provides an interface through which DAS 201 can be controlled and configured by a user. Further, host unit 202 is communicatively coupled with remote unit 214. In certain embodiments, host unit 202 communicates with other host units in other DASs through remote unit 214. For example, a campus, having multiple buildings, has a separate DAS 201 installed in the different buildings. To facilitate communications between the different DASs 201 in the individual buildings, the host units 202 accompanied with each individual DAS 201 communicate with each other through their corresponding remote unit 214.

In a further embodiment, host unit 202 in DAS 201 is also communicatively coupled to intermediate frequency (IF) remote unit 204, which in turn is coupled to IF hub 206. In certain implementations, the host unit 202 is coupled to multiple combinations of IF remote units 204 and IF hub 206. Further, the combination of IF remote unit 204 and IF hub 206 are coupled to multiple master RAUs 208. The IF remote unit 204 and IF hub 206 receive a signal from host unit 202 and reproduces the signal for transmission to master RAUs 208. In a further implementation, IF remote unit 204 receives a digital signal from host unit 202 and converts the digital signal into an analog signal for transmission to master RAUs 208. IF hub 206 receives the analog signal and splits the analog signal for transmission to separate master RAUs 208. Alternatively, IF remote unit 204 and IF hub 206 receive an analog signal and repeat the analog signal for transmission to master RAUs 208. The master RAUs 208 function as expansion units and transmit signals to slave RAUs 212. Slave RAUs 212 transmit the signal to wireless terminals 216. In certain embodiments, master RAUs 208 are also able to transmit signals to wireless terminals 216. When transmitting, the slave RAUs 212 and master RAUs 208 mix the signal up to a transmission frequency for transmission of the signal in a particular communication band. For example, master RAUs 208 and slave RAUs 212 are capable of mixing an IF analog signal received from IF hub 206 into multiple frequency bands that include 700 MIMO, SMR800, Cell, PCS, AWS, and the like.

When base station 230 receives information to communicate to a destination wireless terminal 216 through DAS 201, base station 230 transmits the information to the IF remote unit 204 and IF hub 206 which directs the signal to the RAUs for transmission to the destination wireless terminal 216. In one embodiment, the IF remote unit 204 and IF hub 206 transmit the information to master RAUs 208 which both transmit the information through an antenna for reception by the destination wireless terminal 216 and transmit the information to slave RAUs 212. When a slave RAU 212 receives the information, the slave RAU 212 repeats the information and transmits the information through an antenna for reception by the destination wireless terminal 216.

As described above, a system test is performed to check the IF/RF integrity of the communication paths through DAS 201. In one embodiment, the system test is performed on the entire DAS 201 or a series of communication paths through master RAUs 208 and slave RAUs 212 simultaneously. Alternatively, the system test can perform a communication band specific tests on an individual communication paths through master RAUs 208 and slave RAUs 212 when the master RAUs 208 and slave RAUs 212 are designed to transmit signals in specific communication bands. When performing the system test of the IF/RF integrity of the communication paths through DAS 201, the system test tests the portions of the DAS 201 that exist between IF remote unit 204 and slave RAUs 212. To control the system tests, IF remote unit 204 includes a system test controller 205. System test controller 205 controls the system tests in the communication paths that runs through IF remote unit 204 through any downstream RAUs 208, such as master RAUs 208 and slave RAUs 212 by controlling the generation and disabling of reference tones.

Further, in certain embodiments, the different components of DAS 201 include detectors 210 to aid in the performance of the system test. For example, IF hub 206, master RAUs 208, and slave RAUs 212 include detectors 210. Detectors 210 are used for different functions depending on their location within DAS 210. For example, detector 210 in IF Hub 206 is used to isolate failures in the IF hub 206. The detectors 210 in master RAUs 208 allows for the ongoing integrity check between the IF hub 206 and the master RAUs 208. The detectors 210 in slave RAUs 212 allow for the validation of slave specific RF circuitry as well as for adjusting the gain of the slave RAUs 212. In at least one embodiment, the slave RAUs 212 include multiple detectors 210 that are dedicated to a particular band, such that a detector 210 validates only the RF circuitry that is used for transmissions over a particular communication band.

In certain embodiments, system test controller 205 performs a system test when initiated by a user (for example, through a web interface connected to host unit 202). Alternatively, system test controller 205 performs system tests upon power up or according to a specified schedule. At the beginning of system test, system test controller 205, in IF remote unit 204, disables all generated radio frequency and calibration tones that are transmitted through master RAUs 208 and slave RAUs 212. During the operation of system test, detectors 210 in slave RAUs 212 monitor both the forward and reverse power through the slave RAUs 212. As described above, in the presence of a generated RF or calibration tone, when the detectors measure a reverse power that is high in comparison to the forward power, slave RAUs 212 determine that the high reverse power is indicative of a disconnected antenna. However, when there is no generated RF or calibration tone, the slave RAUs 212 will interpret the high reverse power as indicative of an interfering signal. When the slave RAUs 212 determine that there is an interfering signal, the slave RAUs 212 adjust the performance of future system tests that would be adversely affected by the presence of an interfering signal. In certain implementations, the slave RAUs 212 indicate to the system test controller 205 that there is an interfering signal present that can interfere with the conducting of future system tests. When slave RAUs 212 indicate that an interfering signal is present, the interfering signal can be a signal produced by an interfering signal source 220, like a neighboring DAS or other communication systems, that produces a signal within one of the bands that is sufficiently strong to cause a false alarm indicating that an antenna is disconnected when received by slave RAUs 212.

In one embodiment, when checking for the interfering signal, the system test controller 205 transmits a command to slave RAUs 212 at the beginning of system test that instructs the slave RAUs 212 to measure the forward and reverse power. In one embodiment, system test controller 205 receives the measurements from the slave RAUs 212 and processes the measurements and compares the measurements against an interference threshold. Alternatively, the RAUs 212 compare the measurements against each other and the interference threshold. If the measurements exceed the interference threshold, the slave RAUs 212 will not perform certain tests when instructed by the system test controller 205 because slave RAUs 212 adjust the system tests to prevent the interfering signal from causing false alarms. Conversely, if the processed measurements do not exceed the threshold, the system tests proceed normally as instructed by system test controller 205.

FIG. 3 is a table 300 comparing the addition of an interfering signal level 302 with a reflected calibration tone 310 against an antenna disconnect alarm threshold. When an RAU 212 in FIG. 2 receives a calibration tone and an interfering signal, the combination of signals can be sufficiently strong to cause a false alarm during an antenna disconnect test. As shown in at least the present embodiment, the signal levels of the combination of interfering signals with reflected calibration tones can be divided into three categories. The first category 304 includes combinations of interfering signal levels 302 and reflected calibration tone levels 310 that exceed the alarm threshold. The second category 306 includes combinations of interfering signal levels 302 and reflected calibration tone levels 310 that are within a certain level of the alarm threshold. For example, as shown in table 300, the combination of signal levels within second category 306 are less than 3 dB below the alarm threshold. The third category 308 includes combinations of interfering signal levels 302 and reflected calibration tone levels 310 that are substantially below the alarm threshold, such that a false antenna disconnect alarm is improbable. For example, as shown in table 300, the combination of signal levels in third category 308 are greater than 3 dB below the alarm threshold.

In at least one embodiment, the values illustrated in table 300 are used to determine where to set an interference threshold for determining an interfering signal level that is substantially strong to merit the disabling of future system tests. The interference threshold is a value that is below the antenna disconnect alarm threshold by a predefined amount. For example, in one implementation shown in table 300, when the reflected cal tone level is 0 dB relative to the alarm threshold, an interfering signal level of 10 dB below the reflected cal tone level may cause the alarm threshold to give a false alarm even though the reflected cal tone level does not exceed the antenna disconnect alarm threshold. To prevent the interfering signal level from causing a false antenna disconnect alarm, the interference threshold is set to 10 dB below the antenna disconnect alarm threshold.

In certain embodiments, the interference threshold is dependent on the noise floor of the detector. In one embodiment, a slave RAU 212 as shown in FIG. 2 includes a different detector for each communication band, where each communication band has a different associated noise floor. The detectors that transmit through slave RAUs 212 are able to detect forward and reverse power levels that are above the noise floor. Because detectors 210 in slave RAUs 212 are only able to detect forward and reverse power levels that are above the noise floor, the interference threshold is a power level that is greater than the noise floor.

Further, the antenna disconnect alarm threshold is also dependent on the noise floor of the detector and is different for different communication bands in the slave RAUs 212. Further, in at least one embodiment, antenna disconnect alarm thresholds are determined empirically based on measurements of the noise floor and measured values of signals reflected by a disconnected antenna. Also, the identification of the antenna disconnect alarm threshold and the noise floor for the detector identifies the possible values for the interference threshold as the interference threshold is less than the antenna disconnect alarm and greater than the noise floor and can be different for each communication band through the slave RAUs 212.

Figure 4:
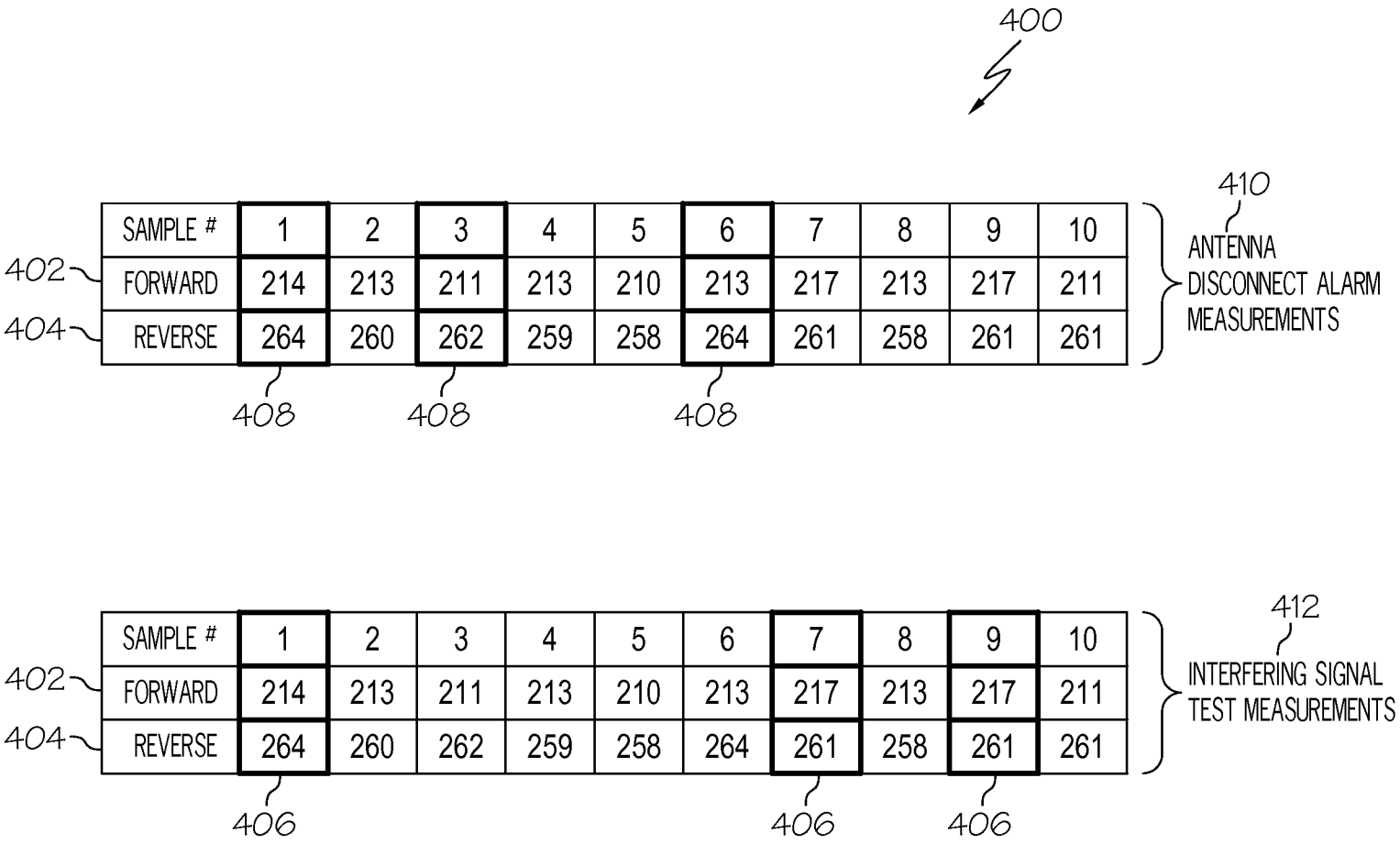
FIG. 4 is a table illustrating multiple measurements of both forward power and reverse power in the absence of a calibration tone according to one embodiment.

In certain embodiments, the slave RAUs 212 use multiple measurements to determine that the antennas connected to slave RAUs 212 in FIG. 2 are receiving an interfering signal. FIG. 4 illustrates tables 400 showing multiple measurements gathered by a detector 210 during the system test to determine if the DAS 201 is in the presence of an interfering signal or if the antenna is disconnected. In the example shown in tables 400, the detector 210 measures both the forward power to gather a forward power measurement set 402 and the reverse power to gather a reverse power measurement set 404. The detector 210 can gather the forward power measurements and the reverse power measurements when gathering antenna disconnect alarm measurements 410 or interfering signal test measurements 412. When performing the interfering signal test, the detector 210 measures both the forward and reverse power a set number of times to ensure that there is an interfering signal that is capable of interfering with future system tests before future system tests are adjusted. For example, as shown in table 400, the detector 210 measures both the forward power and the reverse power 10 times when gathering the interfering signal test measurements 412. In one implementation, the reverse power and the forward power is measured sporadically so that measurements are not periodically taken of an interfering signal when the period of the measurements matches the period of the interfering signal. Also, when the measurements are taken of both the forward and reverse power, the detectors 210 associate the measurements taken of the reverse power with the measurements taken of the forward power such that both associated measurements were taken at approximately the same time.

When the detector has gathered the measurements and formed both the reverse power measurement set 404 and the forward power measurement set 402, the slave RAUs 212 (or a master RAU 208) process the measured data to determine if an interfering signal was received or if an antenna is disconnected. In one implementation, to determine if an interfering signal was received, the slave RAUs 212 identify the three highest values of the forward power measurement set 402 to create a forward power sample set 406. The slave RAUs 212 then identify the reverse power measurements that are associated with the forward power sample set 406, shown in interfering signal test measurements 412. The RAUs 212 then compare the associated reverse power measurements with the forward power measurements in the forward power sample set 406. The forward power measurements in the forward power sample set 406 are averaged together. The reverse power measurements associated with the forward power measurements in the forward power sample set 406 are likewise averaged together. The slave RAUs 212 use the averaged power values to determine if the reverse power exceeds the interference threshold.

In a further implementation, to determine if an antenna is disconnected, the slave RAUs 212 identify the three highest values of the reverse power measurement set 404 to form a reverse power sample set 408, shown in antenna disconnect alarm measurements 410. The RAUs 212 then compare the associated forward power measurements with the reverse power measurements in the reverse power sample set 408. The reverse power measurements in the reverse power sample set 408 are averaged together. The forward power measurements associated with the reverse power measurements in the reverse power sample set 408 are likewise averaged together. The slave RAUs 212 use the averaged power values to determine if the reverse power exceeds the antenna disconnect alarm threshold.

In certain embodiments, the interference threshold is the greater of a determined level below the antenna disconnect alarm threshold and a level that is 2 dB greater than the measured forward power. In one example, where the determined signal level is 10 dB below the antenna disconnect alarm threshold, detectors 210 in slave RAUs 212 in FIG. 2 detect both the forward power and the reverse power when the slave RAUs 212 are not receiving a generated tone from an upstream device. The slave RAUs 212 then determine whether the measured reverse power is greater than 10 dB below the antenna disconnect alarm threshold. If the reverse power is less than 10 dB below the antenna disconnect alarm threshold, the slave RAUs 212 then determine whether the reverse power is 2 dB greater than the forward power. If the reverse power is less than 10 dB below the antenna disconnect alarm threshold and greater than 2 dB above the forward power, the reverse power is determined to result from an interfering signal that can affect the performance of other system tests.

In a further embodiment, the interference threshold used for gain calibration is the same as the interference threshold used for the antenna disconnect alarm threshold. Alternatively, the interference threshold used to determine whether an interfering signal will affect gain calibration is set to a predetermined signal level below a calibration target. For example, the interference threshold for gain calibration is set at a signal level of 8 dB below the calibration target signal level. When the detectors 210 detect a reverse power that is less than 8 dB below the calibration target, the slave RAUs 212 determine that an interfering signal is present that will prevent the proper gain calibration of slave RAUs 212. In an alternative embodiment, signal detectors on the slave RAUs 212 make alternating measurements of the reverse power with and without the presence of a calibration tone. The difference between the two measurements is used to identify the level of the interfering signal. The interfering signal level can then be subtracted from future measurements during the adjustment of the gain and the performance of an antenna disconnect test for the slave RAUs 212.

Figure 5:
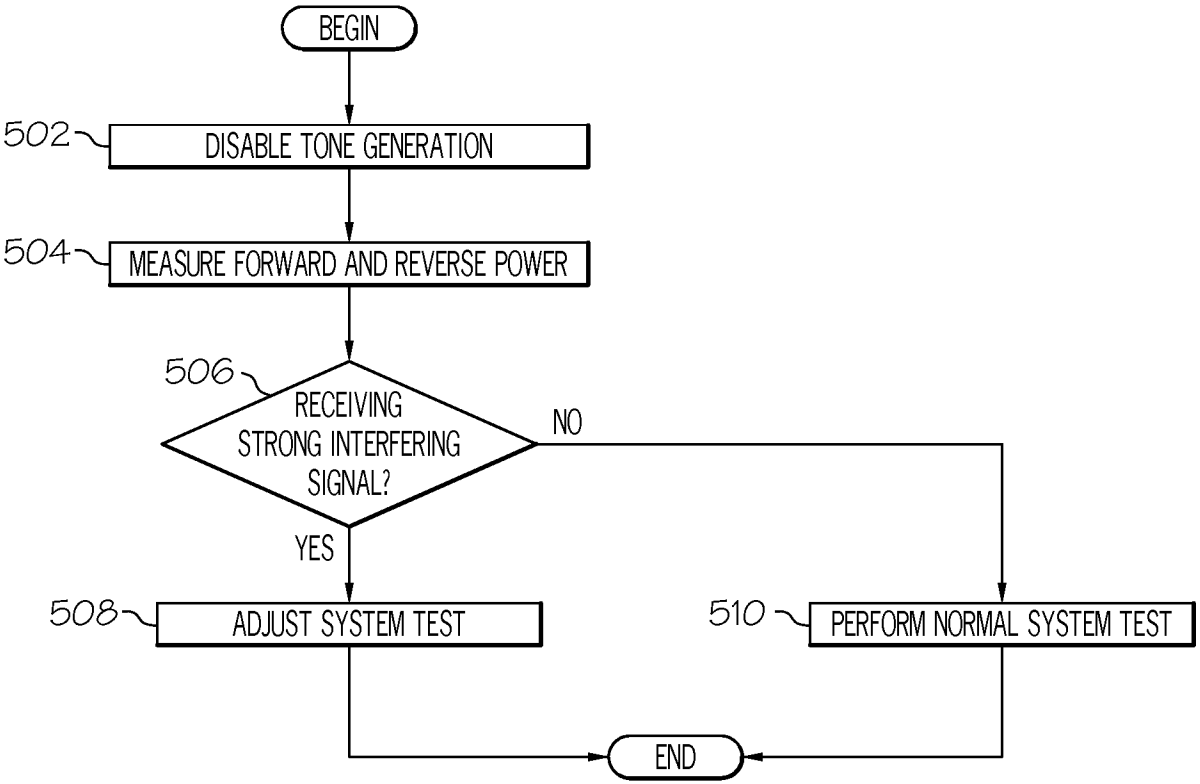
FIG. 5 is a flow diagram illustrating a method for performing a system test according to one embodiment.

FIG. 5 is a flow diagram illustrating a method 500 for testing a DAS. Method 500 begins at 502 with the disabling of tone generation. For example, a system test controller generates calibration tones during the system test of a DAS, where a system controller transmits the calibration tones to an RAU. To check for an interfering signal, the system test controller disables the generation of the tones that are transmitted to an RAU, such that there are no signals being transmitted through the RAU.

Method 500 proceeds at 504 where forward power and reverse power are measured. In one exemplary implementation, a signal detector on an RAU measures the reverse power and the forward power of signals that pass through the RAU when there are no signals being transmitted to the RAU for transmission to wireless terminals. Further, the RAU can have separate signal detectors for both forward and reverse measurements and separate signals for multiple communication bands, which separate signals are measured by the signal detectors.

Method 500 proceeds at 506 where the system determines if the RAU is receiving a strong interfering signal. For example, in at least one implementation, the RAU compares the reverse and forward power measurements against each other and against an interference threshold to determine if the RAU is receiving a strong interfering signal. If the reverse power exceeds the threshold, then the RAU determines that a strong interfering signal is being received. In certain embodiments, the interference threshold is based on thresholds used in other system tests. In at least one example, the interference threshold is set at a predetermined value below a threshold for performing an antenna disconnect alarm test and/or a calibration target. Alternatively, the interference threshold is based on the measured forward power. For example, the interference threshold can be 2 dB above the measured forward power. In one implementation, the interference threshold is the greater of the predetermined value below the threshold for performing an antenna disconnect alarm test and a signal level that is 2 dB above the measured forward power.

When the RAU determines that a strong interfering signal is being received, method 500 proceeds at 508 where at least one system test is adjusted. For example, when the RAU determines that an interfering signal is sufficiently strong enough to interfere with subsequent system tests, some system tests, like an antenna disconnect test are not executed, while other system tests like a gain calibration test is adjusted to compensate for the presence of an interfering signal. When the RAU determines that an interfering signal is not being received, method 500 proceeds at 510 where normal system tests are performed.

EXAMPLE EMBODIMENTS

Example 1 includes a method for testing a distributed antenna system (DAS), the method comprising disabling generation of at least one tone, where the at least one tone is transmitted to a remote antenna unit; measuring at least one of the reverse power and the forward power at the remote antenna unit; determining whether the remote antenna unit is receiving an interfering signal based on at least one of the measured reverse power and the measured forward power; and adjusting at least one subsequent system test based on the determination of whether the remote antenna unit is receiving an interfering signal.

Example 2 includes the method of Example 1, wherein adjusting the at least one subsequent test comprises at least one of adjusting the performance of a system test to detect a disconnected antenna; and adjusting the performance of gain calibration.

Example 3 includes the method of Example 2, wherein adjusting the performance of gain calibration comprises preventing the remote antenna unit from adjusting the gain for signals transmitted by the antenna unit.

Example 4 includes the method of Example 3, wherein adjusting the performance of gain calibration comprises alternating the generation and disablement of the at least one tone; measuring the reverse power with the at least one signal detector. Calculating a difference between the measured reverse power when the at least one tone is generated and the measured reverse power when the at least one tone is disabled; subtracting the difference from the measured reverse power when the at least one tone is generated; and setting the gain of the remote antenna unit based on the result of the subtraction.

Example 5 includes the method of any of Examples 2-4, wherein adjusting the performance of a system test to detect a disconnected antenna comprises alternating the generation and disablement of the at least one tone; measuring the reverse power with the at least one signal detector. Calculating a difference between the measured reverse power when the at least one tone is generated and the measured reverse power when the at least one tone is disabled; subtracting the difference from the measured reverse power when the at least one tone is generated; and determining whether an antenna is connected based on the result of the subtraction.

Example 6 includes the method of any of Examples 1-5, further comprising setting an alarm based on the determination of whether the remote antenna unit is receiving an interfering signal.

Example 7 includes the method of any of Examples 1-6, further comprising measuring the reverse power and the forward power multiple times when the generation of the at least one tone is disabled to form a reverse power measurement set and a forward power measurement set.

Example 8 includes the method of Example 7, wherein the multiple measurements are gathered sporadically.

Example 9 includes the method of Example 7 or 8, further comprising calculating a reverse power average from a subset of the reverse power measurement set and a forward power average from a subset of the forward power measurement set; and comparing the reverse power average against the forward power average.

Example 10 includes the method of Example 9, wherein the reverse power samples in the subset of the reverse power measurement set are associated with forward power samples in the subset of the forward power measurement set.

Example 11 includes the method of any of Examples 1-10, wherein determining whether the remote antenna unit is receiving the interfering signal based on the measured reverse power and the measured forward power comprises determining whether a measured reverse power exceeds an interference threshold, wherein the interference threshold is a signal power level between an antenna disconnect alarm threshold and a noise floor for the at least one signal detector.

Example 12 includes the method of any of Examples 1-11, wherein determining whether the remote antenna unit is receiving the interfering signal based on the measured reverse power and the measured forward power comprises determining whether the measured reverse power exceeds the measured forward power by a predetermined power level.

Example 13 includes an antenna unit, the antenna unit comprising at least one antenna; a transceiver, coupled to the at least one antenna; at least one signal detector that measures reverse power and forward power of signals transmitted to and received from the at least one antenna; and a microcontroller configured to control the operation of the antenna unit, wherein upon receiving a command from a system test controller to perform interference testing, the microcontroller directs the at least one signal detector to measure the reverse power of signals passing through the antenna unit when the antenna unit is not receiving a tone for transmission to the at least one antenna, wherein the microcontroller adjusts at least one subsequent test based on the measured reverse power.

Example 14 includes the antenna unit of Example 13, wherein adjusting the at least one subsequent test comprises at least one of adjusting the performance of a system test to detect a disconnected antenna when the difference between the measured reverse power and the measured forward power exceeds an interference threshold; and adjusting the performance of gain calibration.

Example 15 includes the antenna unit of Example 14, wherein adjusting the performance of gain calibration comprises preventing the antenna unit from adjusting the gain for signals transmitted by the antenna unit.

Example 16 includes the antenna unit of Examples 14 or 15, wherein adjusting the performance of gain calibration comprises measuring reverse power in the presence of a calibration tone and without the presence of the calibration tone; calculating a difference between the measured reverse power in the presence of the calibration tone and the measured reverse power without the presence of the calibration tone; subtracting the difference from the measured reverse power with the presence of the calibration tone; and setting the gain of the antenna unit based on the result of the subtraction.

Example 17 includes the antenna unit of any of Examples 14-16, wherein the interference threshold is a signal power level between an antenna disconnect alarm threshold and a noise floor for the at least one signal detector.

Example 18 includes the antenna unit of any of Examples 13-17, wherein the antenna unit sets an alarm based on the difference between the reverse power and the forward power.

Example 19 includes the antenna unit of any of Examples 13-18, wherein a signal detector in the at least one signal detector is dedicated to measuring reverse power and forward power in a specific communication band.

Example 20 includes the antenna unit of any of Examples 13-19, wherein the at least one signal detector gathers multiple measurements of the reverse power and the forward power multiple times to form a reverse power measurement set and a forward power measurement set during the interference testing.

Example 21 includes the antenna unit of Example 20, wherein the multiple measurements are gathered sporadically during the interference testing.

Example 22 includes the antenna unit of Example 20 or 21, wherein measuring the reverse power of signals passing through the antenna unit when the antenna unit is not receiving a tone for transmission comprises creating a reverse power average from a subset of the reverse power measurement set and a forward power average from a subset of the forward power measurement set; and comparing the reverse power average against the forward power average.

Example 23 includes the antenna unit of any of Examples 20-22, wherein a reverse power measurement and a forward power measurement in the multiple measurements of the reverse power and the forward power are associated with one another.

Example 24 includes the antenna unit of any of Examples 13-23, wherein adjusting at least one subsequent system test comprises adjusting the at least one subsequent system test when the measured reverse power exceeds the forward power by a predetermined power level.

Example 25 includes the antenna unit of any of Examples 13-24, wherein the antenna unit is a remote antenna unit in a distributed antenna system.

Example 26 includes a communication system comprising a host unit; at least one system test controller configured to control the performance of system tests on the communication system, wherein the at least one system test controller performs a test to detect the reception of an interfering signal comprising disabling the generation of tones for transmission through the communication system; and a plurality of remote antenna units communicatively coupled to the at least one system test controller configured to communicatively transmit signals to a plurality of wireless terminals, wherein a remote antenna unit in the plurality of remote antenna units comprises at least one antenna; a transceiver, coupled to the at least one antenna; at least one signal detector that measures reverse power and forward power of signals transmitted to and received from the at least one antenna; and a microcontroller configured to control the operation of the antenna unit, wherein upon receiving a command from the system test controller to perform interference testing, the microcontroller adjusts at least one subsequent test based on measurements of the reverse power by the at least one signal detector.

Example 27 includes the communication system of Example 26, wherein the plurality of remote antenna units comprises at least one master remote antenna unit and at least one slave remote antenna unit, wherein the tones generated by the at least one system test controller are transmitted to the at least one master remote antenna unit, and from the at least one master remote antenna unit to the at least one slave remote antenna unit.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method for testing a distributed antenna system (DAS) *that generates at least one tone*, the method comprising:

disabling generation of *the* at least one tone, where the at least one tone is transmitted to a remote antenna unit;

measuring at least one of [the] *a* reverse power and [the] *a* forward power at the remote antenna unit;

determining*, when there is no tone being transmitted through the remote antenna,* whether the remote antenna unit is receiving an interfering signal based on at least one of the measured reverse power and the measured forward power; and adjusting at least one subsequent system test based on the determination of whether the remote antenna unit is receiving an interfering signal.

2. The method of claim 1, wherein adjusting the at least one subsequent *system* test comprises at least one of:

adjusting [the] performance of a system test *in the at least one subsequent system test* to detect a disconnected antenna; and adjusting [the] performance of gain calibration.

3. The method of claim 2, wherein adjusting the performance of gain calibration comprises preventing the remote antenna unit from adjusting [the] gain for signals transmitted by the *remote* antenna unit.

4. The method of claim 3, wherein adjusting the performance of gain calibration comprises:

alternating the generation and disablement of the at least one tone;

measuring the reverse power with [the] at least one signal detector[.]*;* calculating a difference between the measured reverse power when the at least one tone is generated and the measured reverse power when the at least one tone is disabled;

subtracting the difference from the measured reverse power when the at least one tone is generated; and setting [the] *a* gain of the remote antenna unit based on [the] *a* result of the subtraction.

5. The method of claim 2, wherein adjusting the performance of a system test to detect a disconnected antenna comprises:

alternating the generation and disablement of the at least one tone;

measuring the reverse power with the at least one signal detector[.]*;* calculating a difference between the measured reverse power when the at least one tone is generated and the measured reverse power when the at least one tone is disabled;

subtracting the difference from the measured reverse power when the at least one tone is generated; and determining whether an antenna is connected based on the result of the subtraction.

6. The method of claim 1, further comprising setting an alarm based on the determination of whether the remote antenna unit is receiving [an] *the* interfering signal.

7. The method of claim 1, further comprising measuring the reverse power and the forward power multiple times when the generation of the at least one tone is disabled to form a reverse power measurement set and a forward power measurement set.

8. The method of claim 7, wherein the multiple measurements are gathered sporadically.

9. The method of claim 7, further comprising:

calculating a reverse power average from a subset of the reverse power measurement set and a forward power average from a subset of the forward power measurement set; and comparing the reverse power average against the forward power average.

10. The method of claim 9, wherein the reverse power samples in the subset of the reverse power measurement set are associated with forward power samples in the subset of the forward power measurement set.

11. The method of claim 1, wherein determining whether the remote antenna unit is receiving the interfering signal based on the measured reverse power and the measured forward power comprises determining whether a measured reverse power exceeds an interference threshold, wherein the interference threshold is a signal power level between an antenna disconnect alarm threshold and a noise floor for [the] at least one signal detector.

12. The method of claim 1, wherein determining whether the remote antenna unit is receiving the interfering signal based on the measured reverse power and the measured forward power comprises determining whether the measured reverse power exceeds the measured forward power by a predetermined power level.

13. An antenna unit, the antenna unit comprising:

at least one antenna;

a transceiver, coupled to the at least one antenna;

at least one signal detector that measures reverse power and forward power of signals transmitted to and received from the at least one antenna; and a microcontroller configured to control [the] operation of the antenna unit, wherein upon receiving a command from a system test controller to perform interference testing, the microcontroller directs the at least one signal detector to measure the reverse power of signals passing through the antenna unit when the antenna unit is not receiving a tone for transmission to the at least one antenna, wherein the microcontroller adjusts at least one subsequent test based on the measured reverse power *and the measured forward power*.

14. The antenna unit of claim 13, wherein adjusting the at least one subsequent test comprises at least one of:

adjusting [the] performance of a system test to detect a disconnected antenna when [the] *a* difference between the measured reverse power and the measured forward power exceeds an interference threshold; and adjusting [the] performance of gain calibration.

15. The antenna unit of claim 14, wherein adjusting the performance of gain calibration comprises preventing the antenna unit from adjusting [the] gain for signals transmitted by the antenna unit.

16. The antenna unit of claim 14, wherein adjusting the performance of gain calibration comprises:

measuring reverse power in [the] presence of a calibration tone and without [the] presence of the calibration tone;

calculating a difference between the measured reverse power in the presence of the calibration tone and the measured reverse power without the presence of the calibration tone;

subtracting the difference from the measured reverse power with the presence of the calibration tone; and setting [the] *a* gain of the antenna unit based on [the] *a* result of the subtraction.

17. The antenna unit of claim 14, wherein the interference threshold is a signal power level between an antenna disconnect alarm threshold and a noise floor for the at least one signal detector.

18. The antenna unit of claim 13, wherein the antenna unit sets an alarm based on the difference between the reverse power and the forward power.

19. The antenna unit of claim 13, wherein a signal detector in the at least one signal detector is dedicated to measuring reverse power and forward power in a specific communication band.

20. The antenna unit of claim 13, wherein the at least one signal detector gathers multiple measurements of the reverse power and the forward power multiple times to form a reverse power measurement set and a forward power measurement set during the interference testing.

21. The antenna unit of claim 20, wherein the multiple measurements are gathered sporadically during the interference testing.

22. The antenna unit of claim 20, wherein measuring the reverse power of signals passing through the antenna unit when the antenna unit is not receiving a tone for transmission comprises:

creating a reverse power average from a subset of the reverse power measurement set and a forward power average from a subset of the forward power measurement set; and comparing the reverse power average against the forward power average.

23. The antenna unit of claim 20, wherein a reverse power measurement and a forward power measurement in the multiple measurements of the reverse power and the forward power are associated with one another.

24. The antenna unit of claim 13, wherein adjusting at least one subsequent system test comprises adjusting the at least one subsequent system test when the measured reverse power exceeds the forward power by a predetermined power level.

25. The antenna unit of claim 13, wherein the antenna unit is a remote antenna unit in a distributed antenna system.

26. A communication system comprising:

[a host unit;]

at least one system test controller configured to control [the] performance of system tests on the communication system, wherein the at least one system test controller performs a test to detect [the] *a* reception of an interfering signal comprising disabling [the] generation of tones for transmission through the communication system; and a plurality of remote antenna units communicatively coupled to the at least one system test controller configured to communicatively transmit signals to a plurality of wireless terminals, wherein a remote antenna unit in the plurality of remote antenna units comprises:

at least one antenna;

a transceiver, coupled to the at least one antenna;

at least one signal detector that measures reverse power and forward power of signals transmitted to and received from the at least one antenna; and a microcontroller configured to control [the] operation of the *remote* antenna unit, wherein upon receiving a command from the system test controller to perform interference testing, the microcontroller adjusts at least one subsequent test based on measurements of the reverse power *and the forward power* by the at least one signal detector.

27. The communication system of claim 26, wherein the plurality of remote antenna units comprises at least one master remote antenna unit and at least one slave remote antenna unit, wherein the tones generated by the at least one system test controller are transmitted to the at least one master remote antenna unit, and from the at least one master remote antenna unit to the at least one slave remote antenna unit.

*28. A method for testing a distributed antenna system (DAS), the method comprising:*

*coordinating generation of at least one tone with disabling of the at least one tone, where the at least one tone is transmitted to a remote antenna unit;*

*measuring at least one of a reverse power and a forward power at the remote antenna unit; and*

*determining, when the at least one tone is disabled, whether the remote antenna unit is receiving an interfering signal based on at least one of the measured reverse power and the measured forward power.*

*29. The method of claim 28, further comprising adjusting at least one subsequent system test based on the determination of whether the remote antenna unit is receiving the interfering signal, wherein adjusting the at least one subsequent system test comprises at least one of:*

*adjusting performance of a system test in the at least one subsequent system test to detect a disconnected antenna; and*

*adjusting performance of gain calibration.*

*30. The method of claim 29, wherein adjusting the performance of gain calibration comprises preventing the remote antenna unit from adjusting gain for signals transmitted by the remote antenna unit.*

*31. The method of claim 30, wherein adjusting the performance of gain calibration comprises:*

*alternating the generation and disablement of the at least one tone;*

*measuring the reverse power with at least one signal detector;*

*calculating a difference between the measured reverse power when the at least one tone is generated and the measured reverse power when the at least one tone is disabled;*

*subtracting the difference from the measured reverse power when the at least one tone is generated; and*

*setting a gain of the remote antenna unit based on a result of the subtraction.*

*32. The method of claim 29, wherein adjusting the performance of a system test to detect a disconnected antenna comprises:*

*alternating the generation and disablement of the at least one tone;*

*measuring the reverse power with at least one signal detector;*

*calculating a difference between the measured reverse power when the at least one tone is generated and the measured reverse power when the at least one tone is disabled;*

*subtracting the difference from the measured reverse power when the at least one tone is generated; and*

*determining whether an antenna is connected based on the result of the subtraction.*

*33. The method of claim 28, further comprising setting an alarm based on the determination of whether the remote antenna unit is receiving the interfering signal.*

*34. The method of claim 28, further comprising measuring the reverse power and the forward power multiple times when the generation of the at least one tone is disabled to form a reverse power measurement set and a forward power measurement set.*

*35. The method of claim 34, wherein the multiple measurements are gathered sporadically.*

*36. The method of claim 34, further comprising:*

*calculating a reverse power average from a subset of the reverse power measurement set and a forward power average from a subset of the forward power measurement set; and*

*comparing the reverse power average against the forward power average.*

*37. The method of claim 36, wherein the reverse power samples in the subset of the reverse power measurement set are associated with forward power samples in the subset of the forward power measurement set.*

*38. The method of claim 28, wherein determining whether the remote antenna unit is receiving the interfering signal based on the measured reverse power and the measured forward power comprises determining whether a measured reverse power exceeds an interference threshold, wherein the interference threshold is a signal power level between an antenna disconnect alarm threshold and a noise floor for at least one signal detector.*

*39. The method of claim 28, wherein determining whether the remote antenna unit is receiving the interfering signal based on the measured reverse power and the measured forward power comprises determining whether the measured reverse power exceeds the measured forward power by a predetermined power level.*

*40. An antenna unit, the antenna unit comprising:*

*at least one antenna;*

*a transceiver, coupled to the at least one antenna;*

*at least one signal detector that measures reverse power and forward power of signals transmitted to and received from the at least one antenna; and*

*a microcontroller configured to control operation of the antenna unit, wherein upon receiving a command from a system test controller to perform interference testing, the microcontroller directs the at least one signal detector to measure the reverse power of signals passing through the antenna unit when the antenna unit is not receiving a tone for transmission to the at least one antenna.*

*41. The antenna unit of claim 40, wherein adjusting the at least one subsequent test comprises at least one of:*

*adjusting a performance of a system test to detect a disconnected antenna when a difference between the measured reverse power and the measured forward power exceeds an interference threshold; and*

*adjusting a performance of gain calibration.*

*42. The antenna unit of claim 41, wherein adjusting the performance of gain calibration comprises preventing the antenna unit from adjusting gain for signals transmitted by the antenna unit.*

*43. The antenna unit of claim 41, wherein adjusting the performance of gain calibration comprises:*

*measuring reverse power in presence of a calibration tone and without presence of the calibration tone;*

*calculating a difference between the measured reverse power in the presence of the calibration tone and the measured reverse power without the presence of the calibration tone;*

*subtracting the difference from the measured reverse power with the presence of the calibration tone; and*

*setting a gain of the antenna unit based on a result of the subtraction.*

*44. The antenna unit of claim 41, wherein the interference threshold is a signal power level between an antenna disconnect alarm threshold and a noise floor for the at least one signal detector.*

*45. The antenna unit of claim 40, wherein the antenna unit sets an alarm based on the difference between the reverse power and the forward power.*

*46. The antenna unit of claim 40, wherein a signal detector in the at least one signal detector is dedicated to measuring reverse power and forward power in a specific communication band.*

*47. The antenna unit of claim 40, wherein the at least one signal detector gathers multiple measurements of the reverse power and the forward power multiple times to form a reverse power measurement set and a forward power measurement set during the interference testing.*

*48. The antenna unit of claim 47, wherein the multiple measurements are gathered sporadically during the interference testing.*

*49. The antenna unit of claim 47, wherein measuring the reverse power of signals passing through the antenna unit when the antenna unit is not receiving a tone for transmission comprises:*

*creating a reverse power average from a subset of the reverse power measurement set and a forward power average from a subset of the forward power measurement set; and*

*comparing the reverse power average against the forward power average.*

*50. The antenna unit of claim 47, wherein a reverse power measurement and a forward power measurement in the multiple measurements of the reverse power and the forward power are associated with one another.*

*51. The antenna unit of claim 40, wherein adjusting at least one subsequent system test comprises adjusting the at least one subsequent system test when the measured reverse power exceeds the forward power by a predetermined power level.*

*52. The antenna unit of claim 40, wherein the antenna unit is a remote antenna unit in a ditributed antenna system.*

*53. A communication system comprising:*

*at least one system test controller configured to control performance of system tests on the communication system, wherein the at least one system test controller performs a test to detect a reception of an interfering signal comprising coordinating generation of tones with disabling of the tones, wherein generated tones are transmitted through the communication system; and*

*a plurality of remote antenna units communicatively coupled to the at least one system test controller configured to communicatively transmit signals to a plurality of wireless terminals, wherein a remote antenna unit in the plurality of remote antenna units comprises:*

*at least one antenna;*

*a transceiver, coupled to the at least one antenna;*

*at least one signal detector that measures reverse power and forward power of signals transmitted to and received from the at least one antenna; and*

*a microcontroller configured to control operation of the remote antenna unit based on measurements of the reverse power and the forward power by the at least one signal detector.*

*54. The communication system of claim 53, wherein the plurality of remote antenna units comprises at least one master remote antenna unit and at least one slave remote antenna unit, wherein the tones generated by the at least one system test controller are transmitted to the at least one master remote antenna unit, and from the at least one master remote antenna unit to the at least one slave remote antenna unit.*

*55. The communication system of claim 53, wherein coordinating the generation of tones comprises disabling the generation of tones for transmission through the communication system.*

*56. The communication system of claim 53, wherein the reverse power of signals passing through the remote antenna unit are measured when the remote antenna unit is not receiving a tone.*

* * * * *